United States Patent [19]

Thiele et al.

[11] Patent Number: 4,733,068

[45] Date of Patent: Mar. 22, 1988

[54] CROSSED FIBER OPTIC TACTILE SENSOR

[75] Inventors: Alfred W. Thiele, Woodland Hills; Jeffrey S. Schoenwald, Thousand Oaks; David E. Gjellum, Moorpark, all of Calif.

[73] Assignee: Rockwell International Corporation, El Segundo, Calif.

[21] Appl. No.: 848,515

[22] Filed: Apr. 7, 1986

[51] Int. Cl.[4] .......................... H01J 5/16; H01J 40/14
[52] U.S. Cl. .................................. 250/227; 340/365 P
[58] Field of Search ............................... 250/227, 229; 340/365 P; 350/96.1; 901/33

[56] References Cited

U.S. PATENT DOCUMENTS

| | | | |
|---|---|---|---|
| 4,264,126 | 4/1981 | Sheem | 350/96.15 |
| 4,360,247 | 11/1982 | Beasley | 350/96.15 |
| 4,408,495 | 10/1983 | Couch et al. | 73/655 |
| 4,439,674 | 3/1984 | Amberay et al. | 250/227 |
| 4,451,730 | 5/1984 | Brogardh et al. | 250/227 |
| 4,477,725 | 10/1984 | Asawa et al. | 250/231 R |
| 4,480,182 | 10/1984 | Ely et al. | 340/365 P |
| 4,480,183 | 10/1984 | Ely et al. | 250/227 |
| 4,488,040 | 12/1984 | Rowe | 250/227 |
| 4,609,816 | 9/1986 | Severin | 340/365 P |
| 4,641,026 | 2/1987 | Garcia et al. | 340/365 P |

*Primary Examiner*—David C. Nelms
*Assistant Examiner*—Michael Messinger
*Attorney, Agent, or Firm*—H. Fredrick Hamann; Craig O. Malin; John J. Deinken

[57] ABSTRACT

A fiber optic sensor array includes a row of transmitting optical fibers, with a column of detecting optical fibers overlapping the transmitting fibers. A planar compliant spacer separates the transmitting fibers from the detecting fibers, so that a sensor element is defined at each location where a detecting fiber overlaps a transmitting fiber. The surfaces of each transmitting fiber and each receiving fiber are modified at the location of each sensor element to increase the optical coupling between the transmitting fiber and the receiving fiber at that element. The spacer in the array includes an opening between the transmitting fiber and the detecting fiber at the location of each sensor element. A support surface is affixed to the detecting fibers opposite the compliant spacer and a protective cover layer is affixed to the transmitting fibers opposite the compliant spacer. An array of light emitting elements, with each element in the emitting array being adapted to transmit light into one of the transmitting fibers, and an array of light detecting elements, each element in the detecting array being adapted to detect light emanating from one of the detecting fibers are provided. A clock times the emission of light from each emitting element and times the detection of light at each detecting element. The clock is connected to cause each detecting element to detect light in sequence after each emitting element has emitted light.

21 Claims, 3 Drawing Figures

CROSSED FIBER OPTIC TACTILE SENSOR

BACKGROUND OF THE INVENTION

This invention relates to fiber optic sensors, and more particularly to tactile sensors, which are used to characterize an object by measuring the spatial distribution of the contact forces involved in gripping the object.

Sensors enable a robot to respond to changes in its environment. This adaptability, particularly with respect to the tactile sensing required in manipulation activities, must be developed for future generations of intelligent machines if those machines are to realize the full potential made possible by advances in the state of the art of computing power, artificial intelligence, and mechanical, structural, and control systems.

An ideal tactile sensor should provide both a qualitative image, representative of human tactility, and the quantitative force information which is needed to generate control commands for mechanical systems. Electromagnetic and electrostatic interference is a principal concern because of the complexity of the wiring, addressing, and signal processing aspects of a sensing system that must be placed in close proximity to the tactile transducer. Some combination of preamplification, analog to digital conversion, and, for arrays of transducers, matrix addressing, clocking, and data bus transmission must be configured close to the sensing surface to reduce these interference effects.

A variety of sensing technologies have been applied to this task in the prior art, including conductive elastomers, ferroelectric polymers, silicon strain gauges, magnetostriction, capacitance, and optoelectronics, including fiber optic sensing techniques. Among these different approaches, fiber optics is a particularly attractive technology for tactile sensors because of the reduction in electromagnetic and electrostatic interference which occurs when system data is transmitted optically rather than electrically. The most common applications of fiber optic sensing in the prior art use a source fiber to deliver light to a reflecting or scattering surface through a transparent elastomer or across a gap modulated by pressure on a compliant support structure. A receptor fiber picks up the returned light, which is then converted remotely by a photodiode into an analog electrical signal. The direct response of such a system is usually very nonlinear, but can be adequately modeled and calibrated. Where the fiber itself is employed as the sensing element, forming an array of sensing sites and reading them results in a complexity of conductors, albeit conductors made of glass rather than metal, that must be addressed. The signals from this array must be processed in much the same way as more conventional matrix or array transducer schemes.

Fiber optic sensors can be grouped into three basic categories according to their mode of operation:
(1) the modulation of phase or polarization in single mode fibers,
(2) microbending-induced amplitude modulation in multimode fibers, and
(3) other mechanical amplitude modulators, such as relative displacement and Schlieren grating devices.

Single mode fibers have been used to detect sound, rotation, or other parameters by injecting light at one end of the fiber and detecting it at the other. The physical principle involves a comparison of the phase shift, or interference, between light in the sensor fiber and in the reference fiber. This detection technique, however, requires a reference fiber, optical alignment and coupling are extremely sensitive, and the required electronic circuitry is complex. The resulting signal corresponds only to the total integrated effect along the length of the sensing fiber. Whereas the theoretical sensitivity of the single mode approach is high, laboratory systems have been known to lose as much as three orders of magnitude in sensitivity when installed in operational environments.

Multimode fiber sensing systems benefit from fabrication uniformity and well developed connector technology, packaging, and characterization equipment. The operation of multimode sensors depends upon the reduction in the amount of light energy which is transmitted through the fiber when a continuous single fiber is deformed. This decrease occurs because light in an unperturbed fiber is waveguided through the core of the fiber by total internal reflection in a spectrum of modes determined by the core diameter and the ratio of the optical indices of the core and the surrounding cladding. When the fiber is bent and the cylindrical symmetry is destroyed, light scatters into other modes of propagation, some of which include radiation out of the fiber. Such sensors are termed amplitude sensors. As with monomode fibers, however, the simplest systems do not provide information about the location along the fiber at which a deformation occurs.

Consequently, a need has arisen in the art of tactile sensors for a fiber optic sensor which requires only a relatively simple arrangement of sensing and data transmitting elements while being capable of accurately and reproducibly sensing applied force over a two dimensional area without undue interference from electromagnetic or electrostatic interference.

SUMMARY OF THE INVENTION

The fiber optic sensor array of this invention includes a row of transmitting optical fibers, with a column of detecting optical fibers overlapping the transmitting fibers. A planar compliant spacer separates the transmitting fibers from the detecting fibers, with a sensor element defined at each location where a detecting fiber overlaps a transmitting fiber.

In this sensor array, the surfaces of each transmitting fiber and each receiving fiber can be modified at the location of each sensor element to increase the optical coupling between the transmitting fiber and the receiving fiber at that element. Optical coupling is further enhanced by making the spacer optically transparent, or by providing an opening in the spacer at the location of each sensor element.

In a more particular embodiment, the axis of each transmitting fiber is parallel to the axes of the other transmitting fibers, with the axis of each detecting fiber parallel to the axes of the other detecting fibers and perpendicular to the axes of the transmitting fibers.

Alternatively, the axis of each transmitting fiber may be parallel to the axis of the corresponding detecting fiber at the location of each sensor element.

The sensor array may also include a backing plate support surface affixed to the detecting fibers opposite the compliant spacer and a protective cover layer affixed to the transmitting fibers opposite the compliant spacer.

In a more detailed embodiment, the sensor array includes an array of light emitting elements, with each element in the emitting array being adapted to transmit light into one of the transmitting fibers, and an array of light detecting elements, each element in the detecting array being adapted to detect light emanating from one of the detecting fibers. A clock times the emission of light from each emitting element and times the detection of light at each detecting element, causing each detecting element to detect light in sequence after each emitting element has emitted light.

A method of sensing a force distribution over a two dimensional area includes the steps of providing a plurality of transmitting optical fibers and a plurality of detecting optical fibers overlapping the transmitting fibers. A planar compliant spacer is attached to the transmitting and detecting fibers to separate the transmitting fibers from the detecting fibers. The transmitting and detecting fibers are arranged such that a sensor element is defined at each location where a detecting fiber overlaps a transmitting fiber and the detecting fibers are affixed to a support surface. The force distribution is applied to the fiber and spacer arrangement and light is sequentially injected into each of the transmitting fibers. The light transmitted by each of the detecting fibers is detected after light is injected into each transmitting fiber, thereby measuring the quantity of light coupled from a transmitting fiber to a detecting fiber at each sensor element. The relative amount of light detected at each sensor element is related to the distribution of force over the two dimensional area of the sensor element array.

DESCRIPTION OF THE DRAWINGS

Additional details of the invention are described below in conjunction with the drawings, in which similar numbers are used to refer to like elements throughout all the figures. In the drawings.

DESCRIPTION OF THE INVENTION

The robotic tactile sensor of this invention is characterized by a matrix of optical fibers which are arranged in rows and columns separated by an elastomeric pad. The elastomer provides a compliant response to spatially distributed forces applied to the structure. The magnitude of an applied force is measured by changes in the amount of transmitted light which couples across the gap between a row fiber and a column fiber. The spatial distribution of the force which is applied to the pad is obtained by matrix addressing of the sensor array of row and column fiber intersections. The transmitting fibers are individually excited by optical sources. The light sensed by the detecting fibers is conducted to individually addressed detectors. There are no reflecting structures required to couple light between the output and input fibers—the coupling occurs directly between the fibers. Furthermore, the detection mechanism of this sensor is not based on microbending of the fibers or on a phase shift induced by the applied force field. Rather, the sensor design utilizes the change in optical coupling which occurs between two non-contacting multimode fibers as a force is applied.

Figure 1:
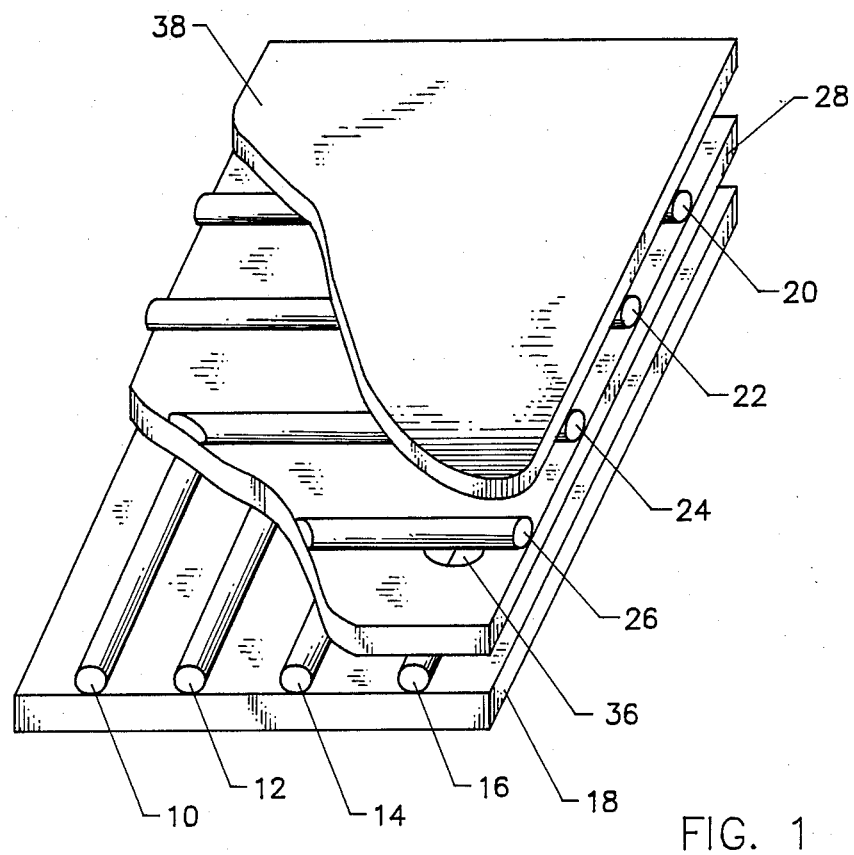
FIG. 1 is a perspective, partially sectioned view of a fiber optic sensor array constructed according to this invention.
Figure 2:
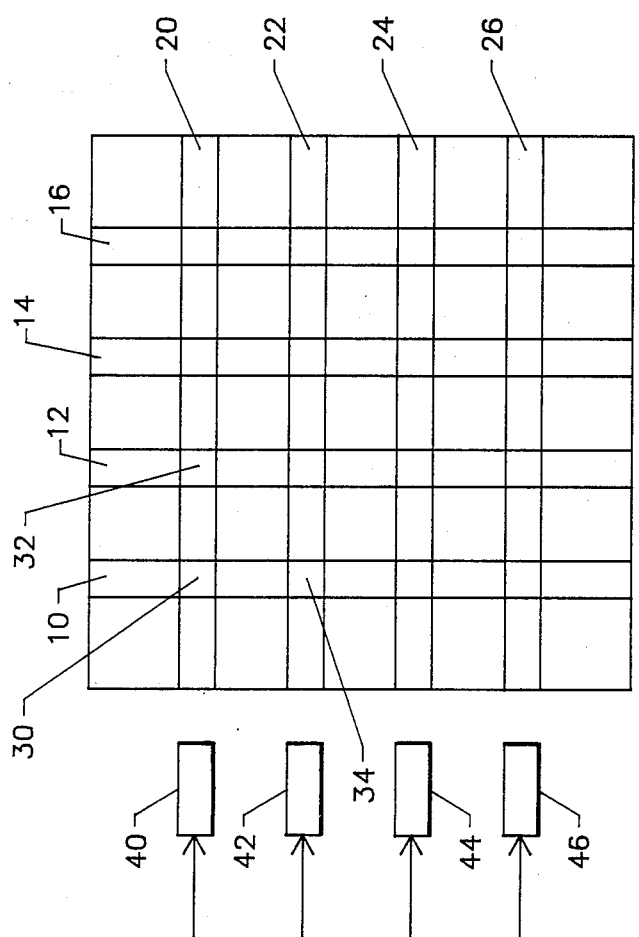
FIG. 2 is a plan view of the FIG. 1 sensor in schematic form, together with some of the associated electronics used with the sensor.
Figure 2:
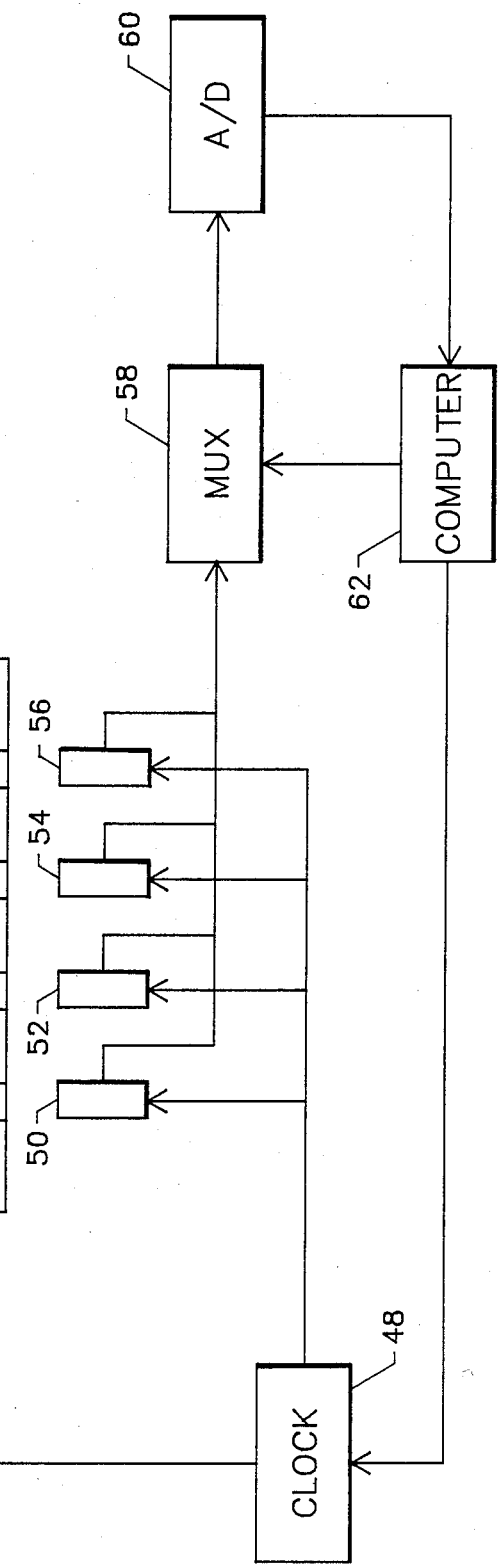

A preferred embodiment of a fiber optic tactile array sensor constructed according to this invention is illustrated in FIGS. 1 and 2. FIG. 1 is a perspective, partially sectioned view of the sensor, while FIG. 2 is a plan view of the FIG. 1 sensor in schematic form, together with some of the associated electronics for making measurements with the sensor.

In FIGS. 1 and 2, a row of detecting optical fibers 10, 12, 14, and 16 is attached to a support surface 18. A column of transmitting optical fibers 20, 22, 24, and 26 is attached to a compliant spacer 28, which maintains a variable separation between the transmitting fibers and the detecting fibers. The transmitting and detecting fibers are oriented orthogonally in the preferred embodiment, such that the fibers define a sensor element at each intersection where a transmitting fiber overlaps a detecting fiber, thereby creating a matrix of sensor locations. The commonly accepted term for a tactile sensor element—in this design, the location of an overlap between a transmitting fiber and a detecting fiber—is a forcel. Forcels 30, 32, and 34, for example, are indicated in FIG. 2. Optical coupling between the transmitting and detecting fibers is increased by utilizing a spacer which is either transparent or in which via holes, such as the via hole 36 in FIG. 1, are provided at the location of each sensor element. The optical coupling between the transmitting fiber and the receiving fiber at a forcel may be further increased by modifying the surfaces of each transmitting fiber and each detecting fiber, by abrading, for example, at each forcel, so that a larger proportion of the light propagating in a transmitting fiber will be diverted out of the fiber at that location and so that a larger proportion of that diverted light will be able to couple into the detecting fiber. A protective wear surface 38 is attached over the detecting fiber array.

As shown in FIG. 2, an array of light emitting diodes (LEDs) 40, 42, 44, and 46 is arranged at one end of the row of transmitting fibers 20–26 and is sequentially excited by a trigger clock 48. An array of photodiodes 50, 52, 54, and 56 is positioned along one end of the column of detecting fibers 10–16 and is also activated by a signal from the clock 48. The photodiodes are scanned by a multiplexer 58, which provides an output signal to an analog-to-digital converter 60. A computer 62 utilizes data received from the convertor 60 to control scanning and data acquisition for the sensor element array.

When an LED is triggered by the clock, it emits a light beam which enters the corresponding transmitting fiber. In this manner, light is injected into the transmitting fiber and propagates through the fiber. Some of the light is diverted out of the transmitting fiber at each forcel and couples into the overlapping detecting fiber at that forcel. The light which enters a detecting fiber is sampled by the corresponding photodiode at the end of the detecting fiber. The photodiodes are triggered by the clock 48 at a rate such that each photodiode in the array samples in sequence the light from its associated detecting fiber within the time period for activating a single LED. In the embodiment illustrated, for example, this is accomplished by sampling the photodiodes four times as often as the LEDs are triggered. After all of the detecting fibers are sampled, light is injected into the next transmitting fiber and the sampling cycle is repeated. In this manner, each sensor element of the array is queried in sequence to measure the amount of light coupled from the transmitting fiber to the detecting fiber at that forcel.

By scanning the entire forcel array in the time domain, it is possible to locate a force as a function of position by measuring the degree of light coupling at each crossed pair of fibers. The intensity of the light which is detected by a photodetector at a particular time in the clock cycle can be related to the distance between the transmitting and detecting fibers at the corresponding forcel. This distance will correspond to the amount of force which is being exerted on the sensor at that forcel location. When this type of data is collected for all the forcels in the sensor, it can be analyzed by the computer 62 to characterize the shape of the object which is in contact with the sensor.

The principle of operation of this sensor is based on the physics of light propagation in an optical fiber. The rows of detecting fibers are separated from the columns of transmitting fibers by an elastomer which permits direct optical coupling between the overlapping fibers. A force applied to the wear surface covering the composite structure will compress the elastomer and increase the optical coupling between a transmitting and detecting fiber at the forcel sensing site by decreasing the separation between the fibers. The compressibility of the elastomer will determine the change in the separation between the transmitting and detecting fibers and, therefore, the amount of light coupling between them. Normally, no light would radiate from the fibers with the small degree of lateral deformation which will be experienced by the fibers under the influence of an applied force. Furthermore, the microbending-induced light losses which are described in the prior art would not be useful in this arrangement, since these losses occur only with deformations of the fiber having a much smaller radius of curvature than those typical in this sensor.

Research concerning the mechanisms responsible for propagation loss in communications optical fibers, however, provides another mechanism for obtaining useful optical coupling between the fibers. With the motivation of improving the transmission efficiency of optical fiber communications systems, Rawson (Rawson, Theory of Scattering by Finite Dielectric Needles Illuminated Parallel to Their Axes, Journal of the Optical Society of America, Volume 62, Page 1284 (1972); Marcuse, Bell System Technical Journal, Volume 48, Page 3233 (1969)) undertook to investigate the sources of attenuation in fibers, based on Bagley's observation (Rawson, Measurement of the Angular distribution of Light Scattered from a Glass Fiber Optical Waveguide, Applied Optics, Volume 11, Page 2477 (1972)) that some low-loss bulk glasses have many spherical inhomogeneities of diameters up to 1.0 micron. Such spherical inhomogeneities might be stretched by the fiber drawing process and survive as very long, very narrow dielectric needles which are precisely aligned with the fiber axis. The angular distribution of radiation scattering from such long but finite dielectric needles, illuminated end-on, is:

$$I_T(\theta) = [k^4 r^4 L^2/16][\Delta\epsilon/\epsilon_0]^2 I_i \mathrm{sinc}^2[kL\theta^2/4\pi] \quad (1)$$

where $I_T(\theta)$ is the power per steradian scattered in the direction $\theta$ from the fiber axis by a dielectric needle of radius r, length L, and dielectric constant $\epsilon_1$, surrounded by a medium of dielectric constant $\epsilon_0$, and where $\Delta\epsilon = \epsilon_1 - \epsilon_0$, $k = 2\pi n_0/\lambda$, where $n_0 = (\epsilon_0)^{\frac{1}{2}}$ and $\lambda$ is the vacuum wavelength of the incident light, and $I_i$ is the light power per unit area incident on the end of the per unit area incident on the end of the needle. The sinc function is defined by sinc $x = (\sin\pi x)/\pi x$.

Note that the $k^4$ dependence in Equation (1) is the same as predicted for Rayleigh scattering. The angular distribution, however, depends on a sinc function of the ratio $L/\lambda$, the length of the needles relative to the vacuum wavelength. For large L, the function modulates rapidly and is highly peaked in the forward direction. Averaging Equation (1) over a distribution of values of L will smear out the radiation pattern, but for large average L, the radiation is still largely forward peaked.

Typical inhomogeneities $\Delta\epsilon/\epsilon_0$ may be on the order of $10^{-2}$ to $10^{-3}$. If the dielectric constant $\epsilon_1$ is due to a void, then $\Delta\epsilon/\epsilon_0$ is approximately $-0.67$, which increases the radiation scattering $I_T(\theta)$ enormously. Furthermore, if this ratio is sufficiently large, a sizable fraction of scattered light is distributed for angles $\theta$ in the range of 90 degrees. By reciprocity, light incident on such needle-like structures will couple light into the optical fiber along the fiber axis. It is this principle, applied at the surface of the fiber, which is used to effect coupling. Additional factors of spatial proximity, fiber diameter, and relative orientation will determine the overall efficiency of the coupling between the transmitting and detecting fibers.

A prototype tactile sensor was constructed according to this invention and similar to the sensor shown in FIGS. 1 and 2, with a 4×4 matrix array covering a 2×2 inch square area. Optical fibers 40 mils in diameter were embedded in a layered structure consisting of a supporting surface, four transmitting optical fiber rows, a compliant elastomer, four transverse detecting optical fiber columns, and a compliant protective wear surface.

The elastomeric layer was provided with via holes arranged so that a direct optical path was established between each crossing of a row fiber and a column fiber. This arrangement provided a compliant support structure and suppressed optical cross talk between neighboring fibers. The elastomer chosen was a closed cell foam commonly found in diving wet suits. It is beneficial if the elastomer has high shear compliance so that compression at one site does not induce an erroneous signal at neighboring sites. Minimizing the point-spread function due to this shear coupling effect remains a challenge in all compliant layered structures.

The row of transmitting fibers was excited by LEDs in a clocked sequential manner. During the time interval in which one row fiber was illuminated, all of the detecting fibers were sequentially polled by reading their respective photodetectors. The detected signal level from each output photodetector was converted from analog to digital output by an eight bit analog-to-digital convertor. An eight bit conversion theoretically provides a 256 gray scale resolution of force, or better than 0.5%, but, in practice, the actual resolution was found to be closer to 1% due to the zero force signal bias. Data for each forcel of the sensor array was communciated to a microcomputer (Hewlett Packard HP216) through a 16 bit parallel interface. Additional signal processing was accomplished by the computer.

The entire array may be calibrated by using a single flat plate to apply a variable uniform force to the tactile pad. The measured zero force bias signal is subtracted, then linearization and scaling of the output signals is accomplished. A standard calibration procedure could be incorporated in the sensor system software to normalize and scale all the data outputs at the same time that the offsets are biased out.

This sensor design offers a number of advantages over competing systems in the prior art, such as conductive elastomers and photo-optic transducers. This sensor provides high spatial resolution, potentially as small as 0.01 inch, as well as excellent dynamic range resolution. There is also low compliance, i.e., the performance of a gripper using this sensor will not be compromised by the presence of the sensor between the jaws of the gripper. This sensor is potentially highly reliable in operation, while conductive elastomer devices degrade with use and photo-optic designs are not tolerant of adverse environments. In addition, this sensor can provide data regarding two types of measurements: total closure force, which can be used, for example, to control jaw motion in a manipulator, and tactile imaging information, which is useful in tactile pattern recognition. The latter mode of operation permits the determination of proper object orientation within the gripper and the detection of slip motion. The matrix structure of the sensor and the time division of the excitation and detection functions reduce the number of discrete optical sources (n), input fibers (n), optical detectors (m), and output fibers (m) from 4 nm to 2(n+m) total components. In a square array this results in a relative reduction factor in the number of components that scales as 1/n. The tactile sensor pad is flexible, and thus could ultimately be incorporated as part of a conformable manipulator of more advanced design.

Figure 3:
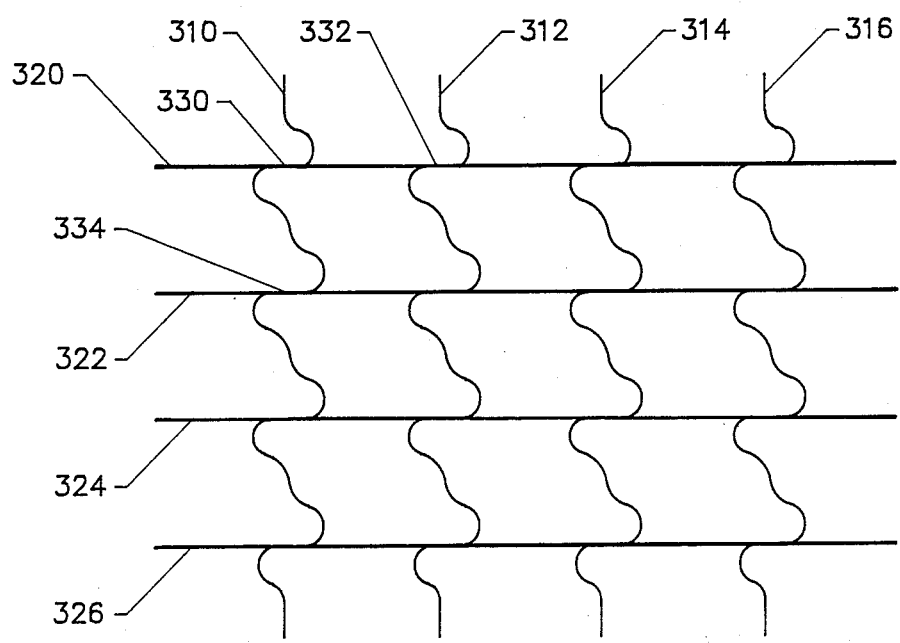
FIG. 3 is a schematic view of an alternative arrangement of transmitting and detecting fibers for the fiber optic sensor array of this invention.

While the transmitting fibers and the detecting fibers are perpendicular to each other in the embodiment illustrated in FIG. 1, this arrangement is not essential and, indeed, may be undesirable in some applications. The optical coupling between a transmitting fiber and a detecting fiber, measured as the relative orientation of the fibers is varied between 0 and 90 degrees, will be greatest when the fibers are parallel to each other. Thus it might be desirable in some applications to arrange the fibers as shown in FIG. 3, which is a schematic diagram illustrating the relative positions of a row of transmitting fibers 320, 322, 324, and 326, and a column of detecting fibers 310, 312, 314, and 316. In this embodiment, the transmitting fibers are placed paralled to each other similar to the arrangment of FIG. 1. The detecting fibers, however, are postioned to meander so that each detecting fiber is postioned parallel to each transmitting fiber where it overlaps the transmitting fiber at a forcel, such as at the forcels 330, 332, and 334.

Another possible variation involves the modification of the fiber surface in order to increase the optical coupling between a transmitting fiber and a detecting fiber. A notch pattern could be cut into the surface of the transmitting fiber at the location of each sensor element. Such a modification of the fiber surface would provide a defined transfer of a quantifiable amount of energy out of the transmitting fiber. This configuration could improve the efficiency of the device and reduce variations in the amount of optical coupling from forcel to forcel.

In the embodiment illustrated, the detecting fibers are shown affixed to the support surface. Although this arrangement was used in the preferred embodiment, it probably makes little difference which way the sensor is fabricated, and the invention may work equally well with the positions of the transmitting and detecting fibers interchanged.

Although the invention has been presented in the context of a tactile sensor for robotic applications, a number of other applications will be apparent to those skilled in the art. This device, for example, could be employed in an analog keyboard, which could not only select whether or not (key "pressed" or "not pressed") a function was selected, but also the intensity with which the function was selected, within a predetermined range of travel. Another application would be in a pressure sensor for liquids or gases, which would require only one forcel, rather than an array of sensor elements.

The preferred embodiment of this invention has been illustrated and described above. Other modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of others. The transmitting fibers, for example, are excited by light emitting diodes in the preferred embodiment, while other light sources, such as lasers, could also be used. In addition, although a particular arrangement for measuring the light coupled out at each forcel is described, other comparable sampling schemes are possible. Consequently, the exemplary embodiments should be considered as illustrative, rather than inclusive, while the appended claims are more indicative of the full scope of the invention.

We claim:

1. A fiber optic sensor array, comprising:
   a plurality of transmitting optical fibers;
   a plurality of detecting optical fibers overlapping the transmitting fibers;
   a planar compliant spacer separating the transmitting fibers from the detecting fibers;
   an array of light emitting elements, each element in the emitting array being adapted to transmit light into one of the transmitting fibers; and
   an array of light detecting elements, each element in the detecting array being adapted to detect light emanating from one of the detecting fibers,
   such that a sensor elements is defined at each location were a detecting fiber overlaps a transmitting fiber, whereby light diverted out of the transmitting fiber at each element by inhomogeneities in the transmitting fiber is coupled into the detecting fiber at the element by inhomogeneities in the detecting fiber, the amount of light coupled into the detecting fiber being proportional to the distance between the transmitting fiber and the detecting fiber at the element.

2. The sensor array of claim 1, wherein the surfaces of each transmitting fiber and each detecting fiber are modified at the location of each sensor element to increase the optical coupling between the transmitting fiber and the detecting fiber at that element.

3. The sensor array of claim 2, wherein the spacer further comprises a planar compliant spacer which is optically transparent.

4. The sensor array of claim 2, wherein the spacer furher comprises an opening between the transmitting fiber and the detecting fiber at the location of each sensor element.

5. The sensor array claim 1, wherein the axis of each transmitting fiber is parallel to the axes of the other transmitting fibers and the axis of each detecting fiber is parallel to the axes of the other detecting fibers.

6. The sensor array of claim 5, wherein the axes of the transmitting fibers are perpendicular to the axes of the detecting fibers.

7. The sensor array of claim 1, wherein the axis of each transmitting fiber is parallel to the axis of the corresponding detecting fiber at the location of each sensor element.

8. The sensor array of claim 1, further comprising a support surface affixed to the plurality of detecting fibers opposite the compliant spacer.

9. The sensor array of claim 8, further comprising a protective cover layer affixed to the plurality of transmitting fibers opposite the compliant spacer.

10. The sensor array of claim 1, further comprising a clock for timing the emission of light from each emitting element and for timing the detection of light at each detecting element.

11. The sensor array of claim 10, wherein the clock is connected to cause each detecting element to detect light in sequence after each emitting element has emitted light.

12. A fiber optic sensor array, comprising:
a plurality of transmitting optical fibers, the axis of each transmitting fiber being parallel to the axes of the other transmitting fibers;
a plurality of detcting optical fibers overlapping the transmitting fibers, the axis of each detecting fiber being parallel to the axes of the other detecting fibers and perpendicular to the axes of the transmitting fibers;
a planar compliant spacer separating the transmitting fibers from the detecting fibers;
an array of light emitting elements, each element in the emitting array being adapted to transmit light into one of the transmitting fibers; and
an array of light detecting elements, each elment in the detecting array being adapted to detect light emanating from one of the detecting fibers,
such that a sensor is defined at each location where a detecting fiber overlaps a transmitting fiber, the surfaces of each transmitting fiber and each detecting fiber being modified at the location of each sensor element and an opening being provided in the spacer between the transmitting fiber and the detecting fiber at the location of each sensor element to increase the optical coupling between the transmitting fiber and the detecting fiber at that element, whereby light diverted out of the transmitting fiber at each element by inhomogeneities in the transmitting fiber is coupled into the detecting fiber at the element by inhomogeneities in the detecting fiber, the amount of light coupled into the detecting fiber being proportional to the distance between the transmitting fiber and the detecting fiber at the element.

13. The sensor array of claim 12, further comprising a support surface affixed to the plurality of detecting fibers opposite the compliant spacer.

14. The sensor array of claim 13, further comprising a protective cover layer affixed to the plurality of transmitting fibers opposite the compliant spacer.

15. The sensor array of claim 12, further comprising a clock for timing the emission of light from each emitting element and for timing the detection of light at each detecting element.

16. The sensor array of claim 15, wherein the clock is connected to cause each detecting element to detect light in sequence after each emitting element has emitted light.

17. A method of sensing a force distribution over a two dimensional area, comprising the step of:
providing a plurality of transmitting optical fibers;
providing a plurality of detecting optical fibers overlapping the transmitting fibers;
attaching a planar compliant spacer to the transmitting and detecting fibers to separate the transmitting fibers from the detecting fibers;
arranging the transmitting and detecting fibers such that a sensor element is defined at each location where a detecting fiber overlaps a transmitting fiber;
affixing the detecting fibers to a support surface;
applying the force distribution to the fiber and spacer arrangement;
sequentially injecting light into each of the transmitting fibers;
sequentially detecting the light transmitted by each of the detecting fibers after light is injected into each transmitting fiber, thereby measuring the quantity of light diverted from a transmitting fiber by inhomogeneities in the transmitting fiber and coupled to a detecting fiber by inhomogeneities in the detecting fiber at each sensor element; and
relating the relative amount of light detected at each sensor element to the force distribution.

18. The method of claim 17, further comprising the step of modifying the surfaces of each transmitting fiber and each detecting fiber at the location of each sensor element to increase the optical coupling between the transmitting fiber and the detecting fiber at that element.

19. The method of claim 17, further comprising the steps of:
orienting the axis of each transmitting fiber parallel to the axes of the other transmitting fibers; and
orienting the axis of each detecting fiber parallel to the axes of the other detecting fibers.

20. The method of claim 19, further comprising the step of orienting the axes of the transmitting fibers perpendicular to the axes of the detecting fibers.

21. The method of claim 17, further comprising the step of orienting the axis of each transmitting fiber parallel to the axis of the corresponding detecting fiber at the location of each sensor element.

* * * * *